United States Patent [19]

Lawson

[11] Patent Number: 4,625,900
[45] Date of Patent: Dec. 2, 1986

[54] OUTBOARD MOTOR MOUNTS FOR VEHICLES

[76] Inventor: Darryl Lawson, 185 Ferguson St., Fallon, Nev. 89406

[21] Appl. No.: 615,462

[22] Filed: May 30, 1984

[51] Int. Cl.⁴ ............................................. B60R 9/08
[52] U.S. Cl. .......................... 224/42.07; 224/42.45 R
[58] Field of Search .......... 224/42.07, 42.06, 42.45 R, 224/42.13, 42.12, 42.03 R

[56] References Cited

U.S. PATENT DOCUMENTS

| | | | |
|---|---|---|---|
| 1,629,478 | 5/1927 | Clark | 224/42.12 |
| 2,425,629 | 8/1947 | Mayer | 224/42.45 R |
| 2,429,551 | 10/1947 | Hitzemann | 224/42.45 R X |
| 2,554,176 | 5/1951 | Edwards | 224/42.45 R X |
| 2,592,050 | 4/1952 | McCharen | 224/42.03 R |
| 2,663,474 | 12/1953 | Kelly | 224/42.03 R |
| 3,428,230 | 2/1969 | Korf et al. | 224/42.06 |
| 4,136,806 | 1/1979 | Wisz | 224/42.03 R X |
| 4,327,849 | 5/1982 | Sharpton | 224/42.13 X |
| 4,381,069 | 4/1983 | Kreck | 224/42.45 R X |
| 4,392,597 | 7/1983 | Traugh | 224/42.13 |

OTHER PUBLICATIONS

J. C. Whitney & Co., Catalog No. 445H, pp. 22, 48, 49, 60, 61 and 276.

*Primary Examiner*—Stephen Marcus
*Assistant Examiner*—Robert Petrik
*Attorney, Agent, or Firm*—Wells & Wells

[57] ABSTRACT

Vehicle attached outboard motor mounts comprising a rectangular metal plate having an outboard motor support at the upper end and connectors at the bottom end for attachment of the mounts to spare tires, spare tire carriers, or bumpers. The metal plate has at least two bends which space the bottom end from the upper end while being parallel to one another. Braces extending from the upper end to the bottom end are optionally employed to stabilize the mounts.

2 Claims, 11 Drawing Figures

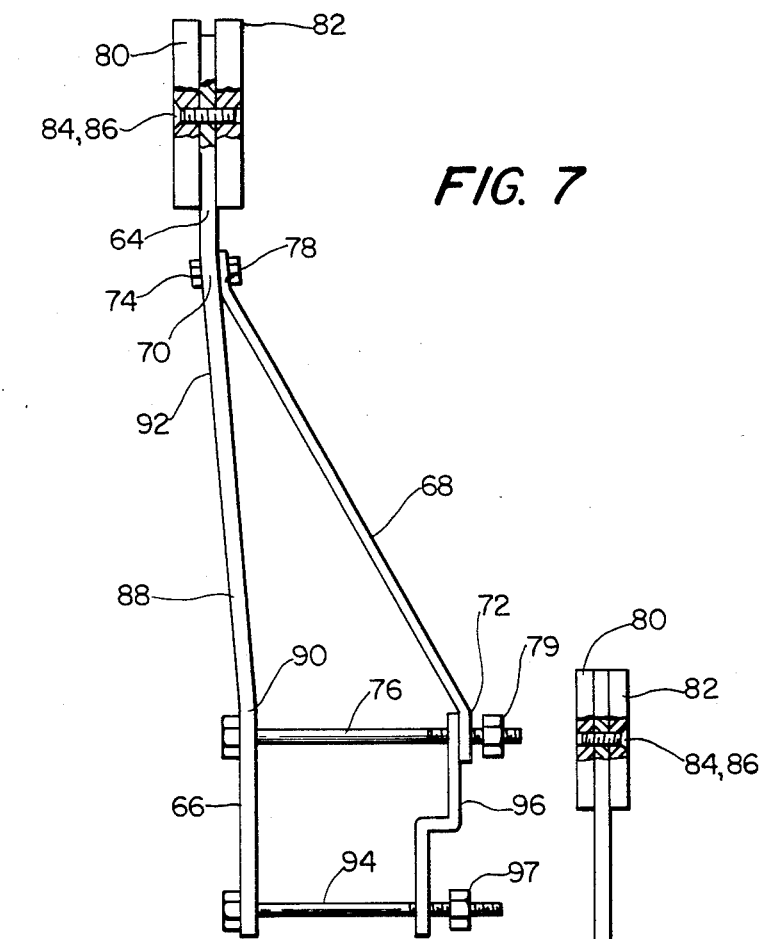
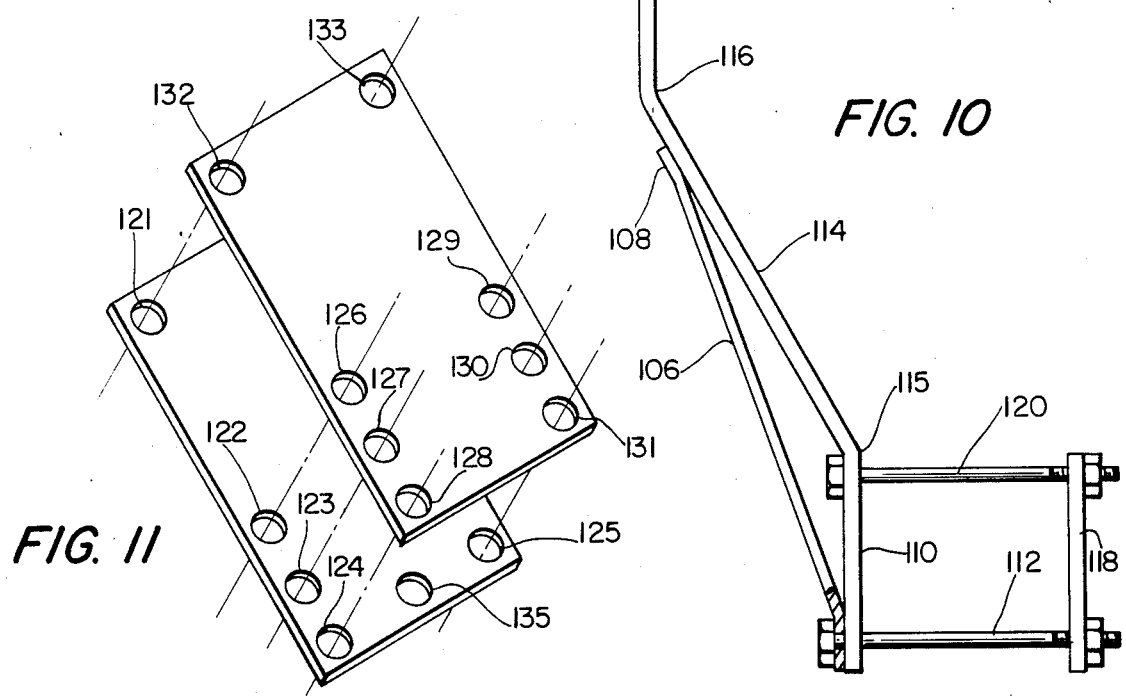

4,625,900

OUTBOARD MOTOR MOUNTS FOR VEHICLES

BACKGROUND OF THE INVENTION

The field of the invention is package and article carriers and the invention is particularly concerned with vehicle attached outboard motor mounts.

The state of the art of vehicle attached outboard motor mounts may be ascertained by reference to U.S. Pat. Nos. 2,439,707; 2,592,050; 2,762,542; 4,136,806; and 4,381,069, the disclosures of which are incorporated herein by reference.

There is a long-felt need for vehicle attached outboard motor mounts for use with vans, recreational vehicles, motor homes, travel trailers, automobiles, pick-ups and other trucks. Because they are less expensive to purchase and more economical to operate, there is a continuing trend toward the use of smaller car-top boats and smaller boat motors for fishing and water recreation, as opposed to larger boats and motors which are normally carried on a trailer.

Aside from safety factors involved with storing an outboard motor within a vehicle, the outboard motor takes up valuable passenger space and may be viewed as an inconvenience. However, by placing the motor to the outside of the vehicle for transit, interior space is conserved, thus utilizing considerably more space for passengers and cargo.

This is very important since the vehicles also seem to be getting smaller, thereby making interior passenger and cargo space extremely valuable, as well as limited.

Recreation vehicles currently in use normally have externally mounted spare tires and bumpers which are square or rectangular in cross-section. Such external spare tire carriers and covers are illustrated in the J. C. Whitney & Company catalog, No. 445H, at pages 22, 48, 49, 60, 61, and 276, the disclosures of which are incorporated herein by reference.

None of the prior art outboard motor mounts, as shown in the above cited U.S. patents, are designed to cooperate with externally mounted spare tires in bumpers having a rectangular cross-section.

SUMMARY OF THE INVENTION

Having in mind the limitations of the prior art it is an object of the present invention to provide outboard motor mounts external to vehicles.

Another object of the present invention is to provide an outboard motor mount which is attachable to an externally mounted spare tire.

Still another object of the present invention is to provide an outboard motor mount which is attachable to a bumper having a rectangular cross-section.

The foregoing objects are accomplished in the present invention by the following embodiments:

(A) an outboard motor mount comprising a rectangular metal plate having means for supporting an outboard motor on one end, means for connecting the plate to the bolt holes of a spare tire wheel or to the bolts of a spare tire carrier at the other end, and at least two bends in the metal plate facilitating the ends being spaced apart but parallel to one another; and (B) an outboard motor mount comprising a rectangular metal plate having means for supporting an outboard motor on one end, means for connecting the plate to an automobile bumper at the other end, at least two bends in the metal plate facilitating the ends being spaced apart but parallel to one another, and a brace extending from one end to the other to maintain stability.

BRIEF DESCRIPTION OF THE DRAWINGS

Illustrative embodiments of the present invention are shown in the drawings appended hereto, wherein:

FIG. 7 is a left side view, partially in crosssection, of an embodiment of the present invention where the outboard motor mount has a bottom and with an offset back plate for attachment to a bumper of a vehicle;

FIG. 10 is a left side view, partially in crosssection, of a variation of FIG. 7 wherein a brace is mounted on the front of the mount; and FIG. 11 is a detailed perspective view suitable for the lower end of the motor mount of FIGS. 7 or 10 showing the placement of holes for size adjustment to bumpers.

DESCRIPTION OF THE PREFERRED EMBODIMENTS

Figure 1:
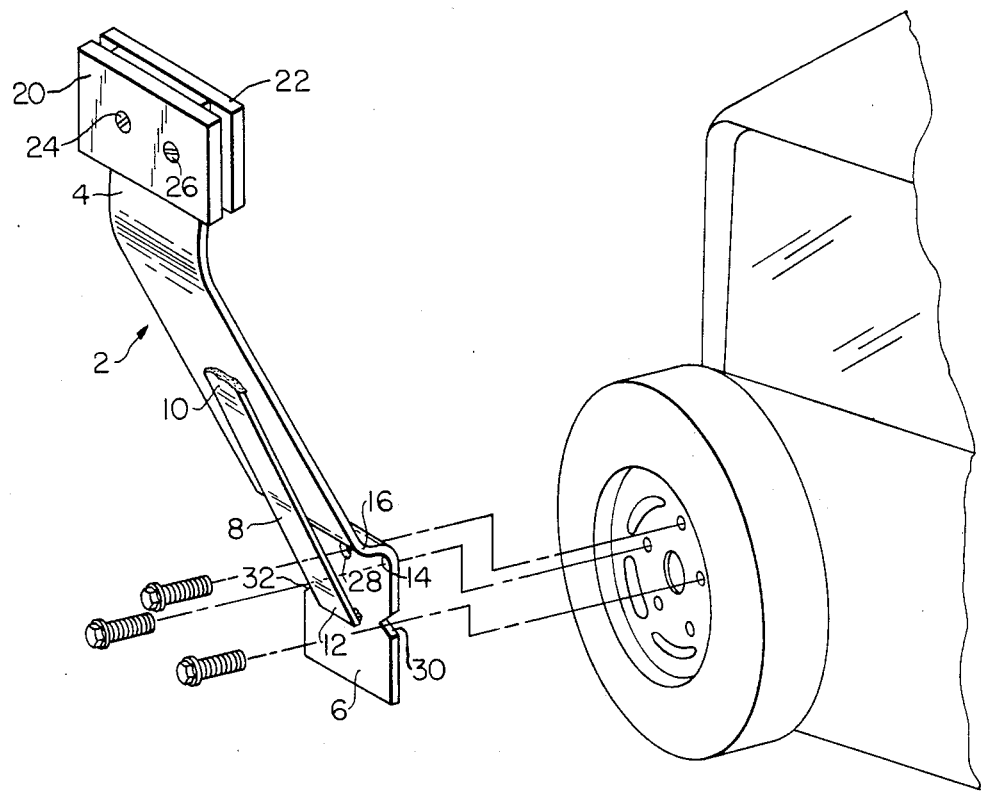
FIG. 1 is a left, front, perspective view of an embodiment of the present invention where the outboard motor mount has a bottom end for attachment to a spare tire or a spare tire carrier, and a support brace on the front.

With particular reference to FIG. 1, the embodiment of the outboard motor mount for attachment to an external spare tire or tire carrier is shown having suitably a rectangular steel strap 1 with an upper end 4 and a bottom end 6. In order to reduce metal fatigue a brace 8 is optionally bolted or welded to the steel strap at positions 10 and 12.

A bottom end offset is defined by bends 14 and 16 and the upper end 4 is positioned vertically by a bend 18.

Two hardwood pieces 20 and 22 are attached to the upper end 4 by bolts or screws 24 and 26 through holes in the upper end.

Central hole 28 is located in the bottom end for mounting on a lug bolt and slots 30 and 32 accommodate the bolt pattern of the spare wheel.

The steel strap 4 is suitably made from 3/16 or $\frac{1}{4}'' \times 4'' \times 19''$ tempered steel and the hardwood pieces 20 and 22 are suitably $1'' \times 6'' \times 9''$.

Figures 2, 3:
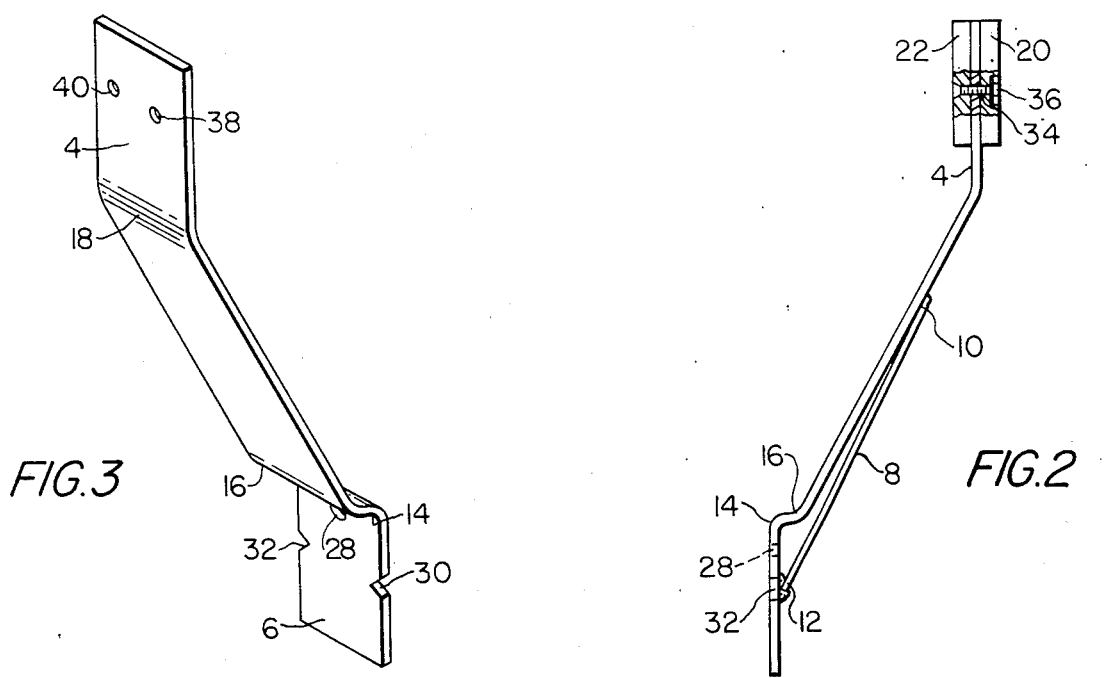
FIG. 2 is a right side view in partial cross-section of the outboard motor mount of FIG. 1.
FIG. 3 is a left, front, perspective view of an embodiment similar to FIG. 1 showing the upper end bolt holes with the hardwood removed from the upper end and no support brace.

FIG. 2, in addition to the showings of FIG. 1, shows washer 34 and nut 36 suitable for securing bolts 24 and 26.

FIG. 3 shows holes 38 and 40 in upper end 4 for insertion of bolts 24 and 26. These holes are suitably 3/16" in diameter.

Figure 4:
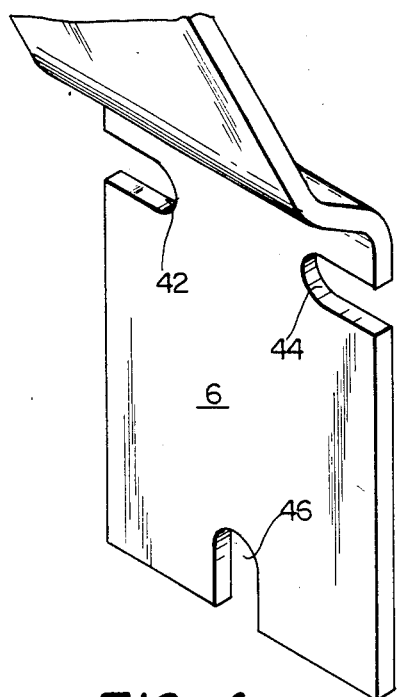
FIG. 4 is a detailed showing of the bottom end of the motor mount showing a different placement of slots for connection to a spare tire or a spare tire carrier.

The embodiment of FIG. 4 shows slots 42, 44, and 46 suitable for mounting the bottom end on a three stud spare tire carrier where each of the three studs forms the apex of a triangle.

Figure 5:
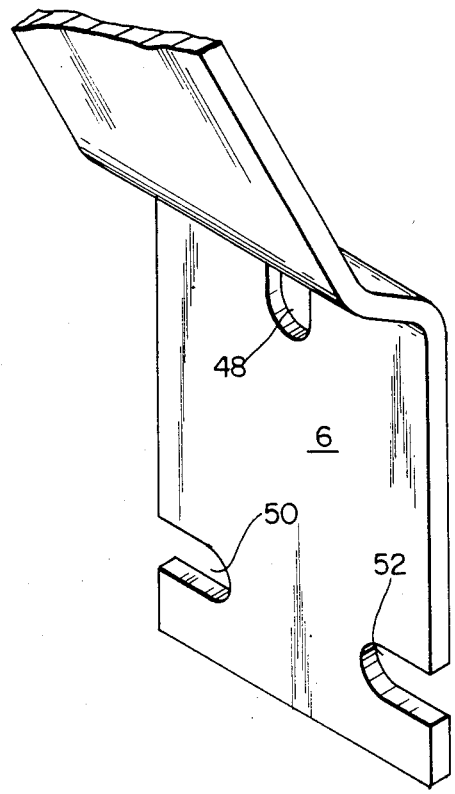
FIG. 5 is a detailed showing similar to FIG. 4 with the connector slots in a different position.

FIG. 5 has slots 48, 50 and 52 suitable for mounting on a three stud spare tire carrier as in FIG. 4.

Figure 6:
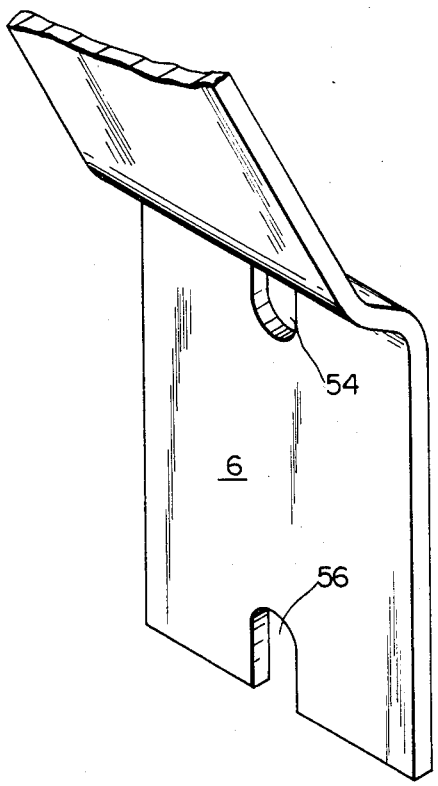
FIG. 6 is another detailed showing of the positioning of the connector slots.

Slots 54 and 56 of FIG. 6 are suitable for connecting the outboard motor mount to a two stud spare tire carrier.

The outboard motor mount for a bumper as shown in FIG. 7 has an upper end 64, a bottom end 66, and a brace 68. The brace 68 can be attached at positions 70 and 72 by welding or bolt holes accepting bolts 74 and 76 having nuts 78 and 79.

Hardwood blocks 80 and 82 are secured to upper end 64 by bolts 84 and 86.

Rectangular steel strap 88 has forward bend 90 and rearward bend 92 for maintaining upper end 64 parallel to bottom end 66 but spaced apart.

Bottom end 66 is secured to a bumper by a plurality of bolts 76, 94 passing through an offset back plate 96, and secured from the back of the bumper by nuts 79 and 97.

Steel strap 88 is suitably made from 3/16"×4"×30" tempered steel and brace 68 is suitably made from 3/16"×1"×15" tempered steel. Offset back plate 96 is suitably 4"×13" with a ½" offset.

Figure 8:
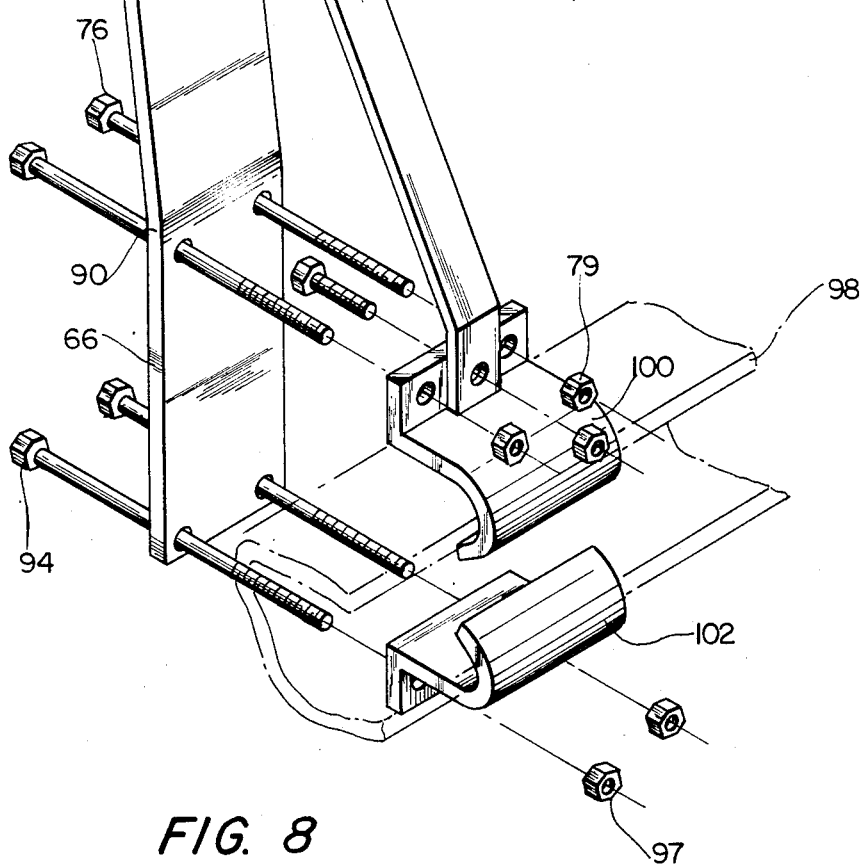
FIG. 8 is an exploded left side, perspective view, similar to FIG. 7, showing hook-type brackets instead of the offset back plate for attachment to a bumper.

In FIG. 8, many of the elements are essentially the same as in FIG. 7 with the difference being in the means for attaching the bottom end 66 to the bumper 98. Hook type brackets 100 and 102 are curved into hooks for containing the rear end of the bumper.

Figure 9:
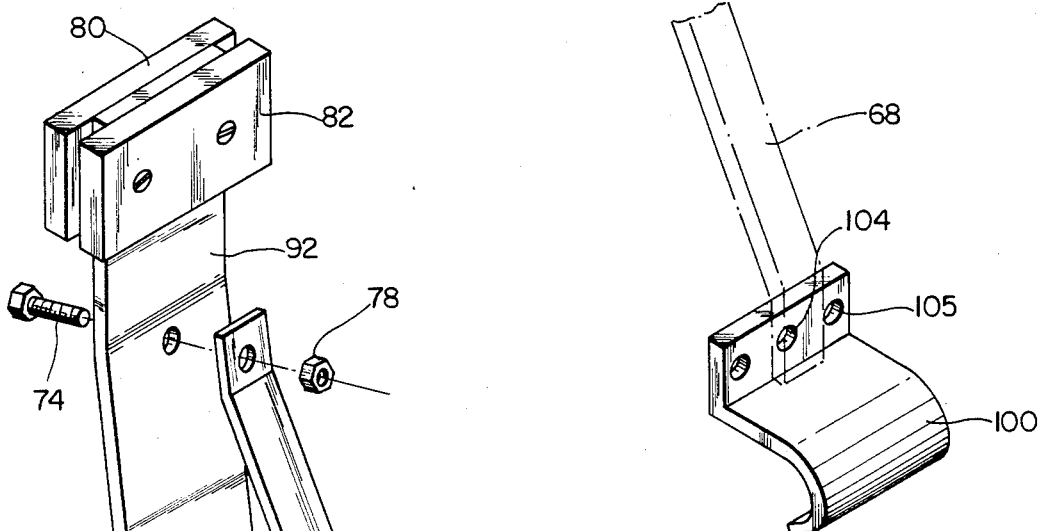
FIG. 9 is a detailed showing in perspective of one of the hook-type brackets of FIG. 8.

Upper hook bracket 100 is shown in FIG. 9 having holes 103 and 105 for securing two bolts through them to bottom end 66 and a middle hole 104 for securing the bottom of brace 68. Of course, bottom hook 102 needs only two bolt holes.

The embodiment of FIG. 10 differs from that of FIG. 7 in having a brace 106 forward of the mount welded at 108 and secured to bottom end 110 by at least one bolt 112. The metal strap 114 has 45 degree offsets at 114 and 116.

Rectangular or square back plate 118 is secured to the inside of a bumper by at least four bolts, as represented by 112 and 120.

FIG. 11 shows bottom end 110 having adjustment holes 122, 123, 124, and 125 cooperating with back plate holes 126, 127, 128, 129, 130 and 131 so that the bottom end and the back plate can accommodate different sized bumpers. Bolt holes 121, 131, and 133, in cooperation with bolts, secure the upper portion of the back plate to the bottom end of the mount. Bolt hole 135 is suitable for securing the bottom of strap 106.

What I claim is:

1. An outboard motor mount for attachment to a vehicle bumper and not otherwise supported by the vehicle body, comprising:
   (a) a rectangular unitary metal plate having a first end, a second end, a front side facing away from said vehicle body and a rear side;
   (b) means for supporting an outboard motor on said first end;
   (c) means on said second end for attachment to said bumper;
   (d) two bends in said metal plate facilitating said ends being spaced apart and substantially parallel to one another;
   (e) a straight intermediate portion of said metal plate extending between said bends;
   (f) a metal brace unitary with said metal plate on said front side extending from said intermediate portion to said second end without support of said vehicle body other than said brace;
   (g) said brace welded at said intermediate portion and bolted at said second end; and
   (h) said means on said second end comprising bolt holes in said second end, a rectangular back plate having corresponding bolt holes therein and bolts extending from said second end to said back plate.

2. The outboard motor mount of claim 1, wherein said means for supporting an outboard motor comprise bolt holes in said first end, wooden blocks on each side of said first end and bolts extending through said wooden blocks and said bolt holes.

* * * * *